United States Patent [19]

Poma

[11] 3,979,676

[45] Sept. 7, 1976

[54] DELTA MODULATION APPARATUS

[75] Inventor: Mario Poma, Guelph, Canada

[73] Assignee: International Standard Electric Corporation, New York, N.Y.

[22] Filed: Oct. 21, 1974

[21] Appl. No.: 516,252

[52] U.S. Cl. ............................. 325/38 B; 332/11 D
[51] Int. Cl.² ........................................... H04B 1/00
[58] Field of Search ............. 325/38 A, 38 B, 38 R; 332/11 D

[56] References Cited
UNITED STATES PATENTS

| | | | |
|---|---|---|---|
| 3,555,423 | 1/1971 | Weston | 325/38 B |
| 3,609,552 | 9/1971 | Limb | 325/38 B |
| 3,706,944 | 12/1972 | Tewksbury | 325/38 B |
| 3,757,252 | 9/1973 | Deschenes | 325/38 B |
| 3,795,900 | 3/1974 | Monford | 325/38 B |
| 3,859,597 | 1/1975 | Zwaal | 325/38 B |
| 3,878,465 | 4/1975 | Stephenne | 325/38 B |

Primary Examiner—Robert L. Griffin
Assistant Examiner—Robert Hearn
Attorney, Agent, or Firm—James B. Raden; Marvin M. Chaban

[57] ABSTRACT

Disclosed is a digital modem using continuously variable sloped delta modulation and adapted for digitizing voice signals in a telephone system. In the analog to digital direction (A/D), an analog input signal is converted into a digital output, the output logic condition being indicative of the direction of change in amplitude from the last signal input. The signal pulse indicating positive change or absence of pulse indicating negative change is passed to a shift register for transmission of the first pulse signal and storage of a plurality of bits. A feedback network receives the pulse bits from the shift register, and the bits are converted to a summed signal for resolution into a reconstructed or simulated signal against which the incoming signal is checked. For the receiving or D/A direction, a somewhat similar circuit in reverse is used to reconstruct an analog signal from the received data bits.

3 Claims, 1 Drawing Figure

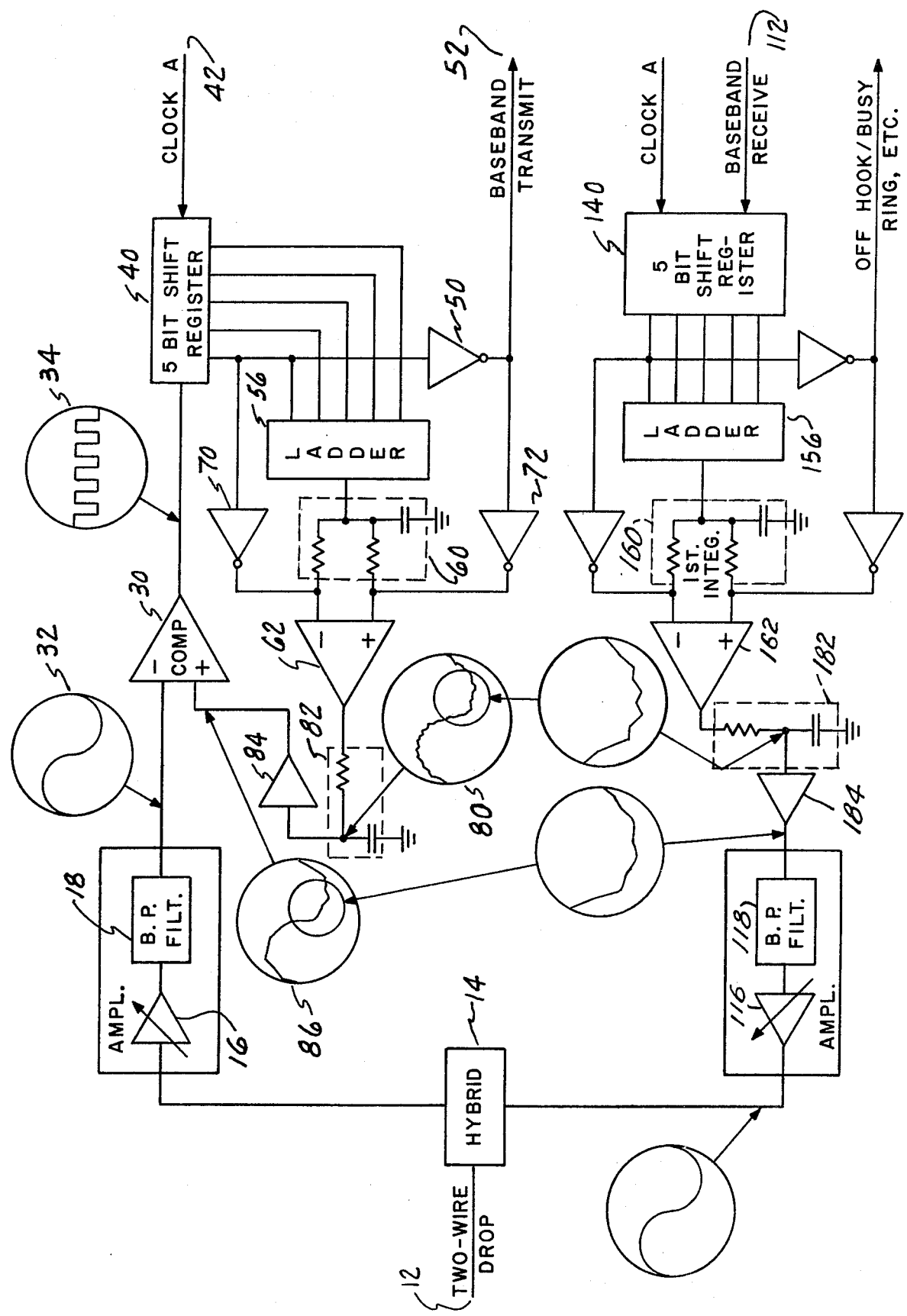

DELTA MODULATION APPARATUS

BACKGROUND OF THE INVENTION

The present invention comprises an improvement over the encoder-decoder shown by Canadian patent 935,581 to E. Pinede et al issued 10/10/73.

Continuously variable sloped delta modulation is generally known in the art. For example, the above noted Canadian patent shows an encoder in which voice signals are fed to the CVSD input, which passes signals in the voice frequency range. A comparator, which may be in the nature of a difference amplifier, compares the voice frequency signal with a digital approximation of that signal. The output of the comparator is gated through a clocked sample gate. The sample is stored in a three-bit shift register, a code being formed responsive to the amplitude of the voice sample. An exclusive OR gate is enabled when three bits are simultaneously present in the shift register. The output of the exclusive OR gate is weighted in a low-pass syllabic filter and then applied to a pulse amplitude modulator (PAM). The PAM sample is integrated and fed back to the comparator to provide the digital approximation for comparison purposes.

SUMMARY OF THE INVENTION

The present invention comprises an improved continuously variable sloped delta modulator and demodulator for use in encoding and decoding voice frequency signals for transmission within a telephone system. A modulator-demodulator combination (modem) is provided in each line circuit in the system, and in trunk circuits where analog signals are to be transmitted.

In each portion of the modem, signals are fed back in an approximation of the analog incoming signal. The output of the feedback network is delayed in time from the input signal by an interval. The delayed signal always is at an amplitude level different from the input signal such that the comparison will always indicate a difference in amplitudes.

It is therefore an object of the invention to provide an improved modulator for encoding and decoding voice frequencies.

It is another object of the invention to provide an improved modulator producing continuously variable sloped delta (CVSD) signals based on speech frequency inputs.

It is a still further object of the invention to provide an improved CVSD modulator/demodulator in which input signals are compared with simulated, delayed signals which are always different in amplitude to provide an output change on each signal comparison.

Other objects, features and advantages of the invention will become apparent from the following detailed description viewed in light of the single drawing.

BRIEF DESCRIPTION OF THE DRAWING

The drawing is a schematic circuit diagram largely in block form embodying my invention.

DETAILED DESCRIPTION OF THE DRAWING

Analog signals enter the modulator via the two-wire drop lead 12 from a subscriber station or the like and pass through the hybrid 14 to the transmit amplifier 16. The signals are amplified and pass to a filter 18 designed to pass signals in a voice frequency pass band such as 300 Hz to 3.4 KHz. Signals passed by the filter are passed to the negative input of comparator 30. Signals passed by the filter are of sine wave or analog form as shown in box 32.

Comparator 30 examines the analog input signal against a reconstructed signal from the feedback decoder. If the analog input signal is greater than that from the feedback decoder, the comparator will produce a logic "1" output signal. If the analog input signal is less than that from the feedback decoder, the comparator output will be a logic "0". Thus the comparator output will be a series of either ones and zeros depending on the relative amplitude of the two input signals.

From the comparator, the resulting digital signal (indicated by box 34) is sent to the input of a five-bit shift register 40. The shift register is clocked 44,000 times per second by a clock input on lead 42 giving a clock period of approximately 20 microseconds. On each clock pulse, a new bit is shifted into the register.

The first output from the shift register passes through an inverter 50 to the output lead 52 for transmission as a digital signal over a wire span or to other processing equipment (not shown).

The five outputs from shift register 40 are passed to a suitable ladder attenuating circuit 56. Such ladder attenuators are well-known in the art, a representative one being shown by U.S. Pat. No. 3,562,743 which issued 2/9/71 to C. LeRouge et al. The ladder shown in block form causes an integrator circuit 60 to charge to a voltage proportional to the number of ones and zeros present at the input to the ladder. The integrator output is then applied to the positive and negative inputs of an operational amplifier - 62.

The state of the first output from the five-bit shift register determines which input of the operational amplifier 62 will be activated during a particular time period. If the first output (last bit from the comparator) is a "1", indicating the signal from the input line 12 has greater amplitude than the signal from the feedback decoder, the positive input of the operational amplifier 62 will be enabled. This causes the output level of the amplifier to increase in an effort to match the amplitude of the signal from the input line 12. Conversely, if the first output of the shift register is a zero, the negative side of the operational amplifier will be enabled causing a negative swing on the output. Thus, the output of the amplifier 62 will be swung either up or down in amplitude.

The negative input of operational amplifier 62 is enabled via an inverter 70, which may take the form of a transistor switch feeding the first signal from the shift register 40 to amplifier 62. The positive input of the amplifier is activated by feeding the first output of the shift register through the output inverter 50 and inverter 72 (which may be a transistor) to the positive amplifier input.

Thus the output of the operational amplifier is determined by two factors. The amplitude of the output is determined by the relative charge on the integrator 60 and the positive or negative aspect of the output signal is determined by the last output from the comparator. If the last signal from the comparator was a "1", indicating the analog input signal was greater than the reconstructed signal, the output from the operational amplifier will be positive. The output of amplifier 62 will be negative if the last output of the comparator was a zero. Thus, the output of the amplifier will indicate a change condition from the analog signal.

At the output signal from the operational amplifier 62 is a series of positive or negative going pulses as shown by circle 80 which follow the charging curve of integrator 60 at the input to amplifier 62. Fairly sharp changes in the waveform occur as the output changes from positive to negative. This rough approximation of the two-wire signal is passed through a second integrator 82 which acts as a low pass filter which considerably smooths the transition points. The second integrator 82 then passes the reconstructed signal through a buffer 84 which improves the waveform even more to the form shown by circle 86. The buffer then sends the reconstructed signal to the positive input of the comparator.

Since the comparator is looking at both the input analog signal from the lead 12 and the reconstructed signal from the feedback network, the feedback signal is always 20 microseconds behind the input due to a delay both within the ladder circuit and within integrator 60, the two signals will never be equal. Repeating, each clock pulse causes a change indication, either up or down so that each successive indication of the feedback network will be different in amplitude than the preceding input signal. This condition provides the comparator with a difference in amplitude levels at all times. A series of "1" outputs indicate a continuous rise in level and a series of "0" outputs indicate a decline. Thus, changes from "1" to "0" outputs indicate not only changes in amplitude but frequency changes, too.

The receive side of the CVSD operates in much the same manner insofar as decoding is concerned. Digital signals are received over lead 112 clocked through a five-bit shift register 140, through a ladder 156, integrator 160, operational amplifier 162, second integrator 182 and buffer 184 in the same manner as the feedback circuit of the transmit side. Additional circuitry is used following the buffer to further smooth the signal and amplify it to the desired level.

From the receive buffer 184, the signal enters a 300 Hz to 3.4 KHz bandpass filter 118 which cleans up the balance of irregularities in the reconstructed analog signal. This filter is followed by an amplifier 116 for level coordination. The output analog signal then passes through the hybrid 14 to the lead 12 to the subscriber line or trunk, as indicated.

I claim:

1. A continuously variable sloped delta modulator for voice frequency signals comprising: a source of analog input signals within the voice frequency range, said modulator including a comparator for producing binary signals derived from said analog input signals, means coupling said source to one input of said comparator, a network for reconstructing an analog based on said binary signals, and a feedback path between said network and a second input to said comparator for comparison with said analog input signal to produce a modulator output signal, said reconstructing network including, a multiple bit shift register for storing successive binary signals received from said comparator, a first output from said register indicative of the binary signal most recently received by said register from said comparator, an output signal path from said modulator for transmitting an output indicative of said most recently received binary signal, a multiple input ladder attenuator network receptive of successive signals in parallel clocked from said shift register, said attenuator network operative to sum and weight signals received from said register and for delivering successive signals for feedback, first means for integrating successive signals received from said attenuator network, second integrating means productive of an amplitude envelope signal based on the slope of the signal received from the first integrating means, and a first and a second bypass path coupling said register first output path into said feedback path bypassing said attenuator network.

2. A modulator as claimed in claim 1, wherein there is a second comparator interposed between said first and second integrating means, and means coupling said register first output to respective inputs of said second comparator by said first and second bypass paths, respectively, for comparing the successive outputs of said first integrating means with successive binary input signals received from said register.

3. A modulator as claimed in claim 2, wherein said second comparator includes two inputs, means coupling each of said last-mentioned inputs to an output of said first integrating means, and each second comparator input also coupled, respectively, to said first and second bypass paths, means in said first bypass path to one input to said second comparator for inverting the polarity of a digital signal being fed to said second comparator to switch the output of the first integrating means to the other input to said comparator during the receipt of said signal.

* * * * *